Feb. 16, 1965     W. L. TRAFTON     3,169,289
MOLDING FASTENER
Filed May 10, 1961
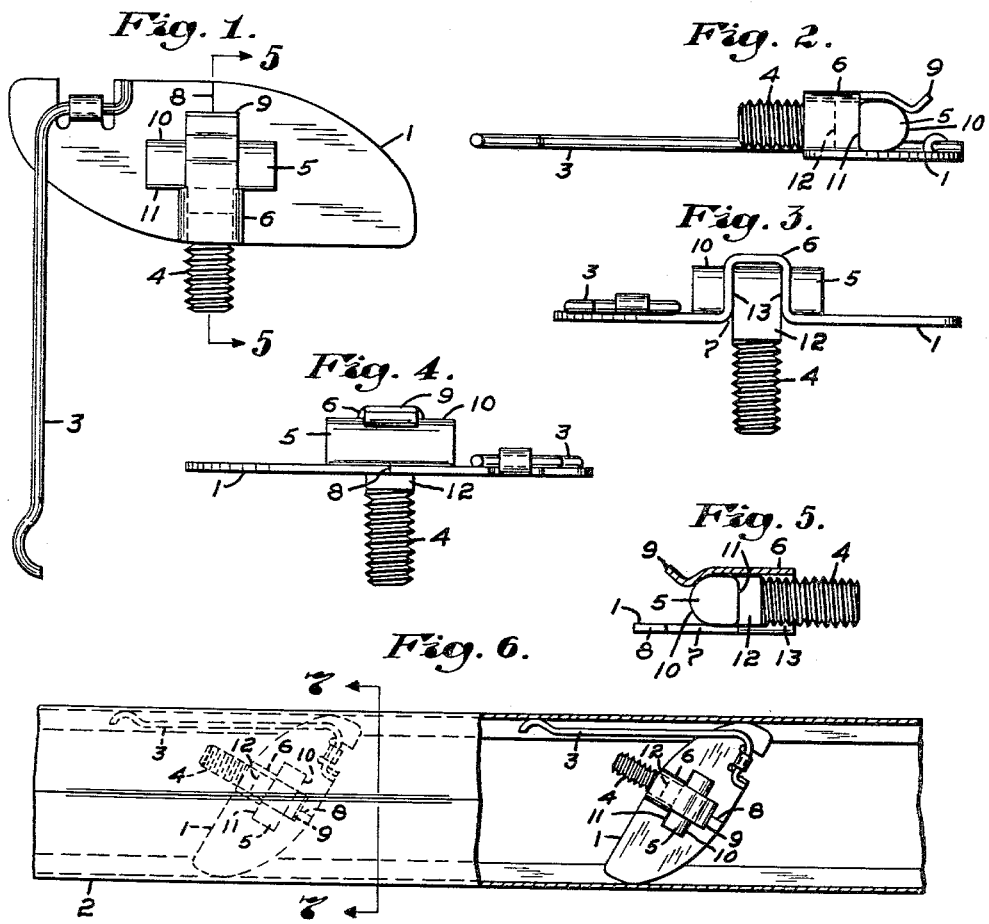
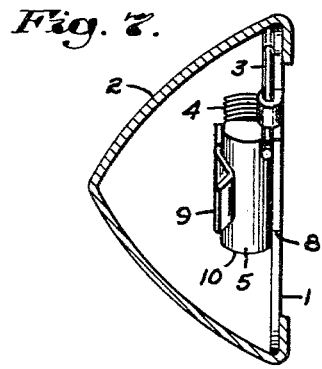
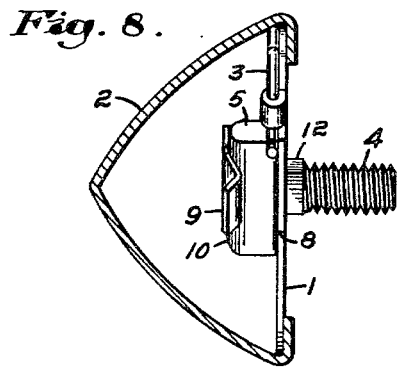
Inventor:
Warren L. Trafton,
by Walter S. Jones
Atty.

United States Patent Office 3,169,289
Patented Feb. 16, 1965

3,169,289
MOLDING FASTENER
Warren L. Trafton, Grosse Pointe, Mich., assignor to United-Carr Incorporated, a corporation of Delaware
Filed May 10, 1961, Ser. No. 109,118
6 Claims. (Cl. 24—73)

This invention aims to provide an improved fastening device for use in the attaching of hollow moldings and the like to suitable supports. An example is a hollow molding used as a decoration on a motor vehicle.

An object of the invention is to provide an improved molding fastener that may be assembled into a hollow molding prior to attachment of the molding in a position and the fastener may lie completely within the molding until it is necessary to expose a portion of it for engagement with a support.

A further object of the invention is to provide a simple, inexpensive, easily operable molding fastener having a cross plate of any desired shape that may be inserted into a molding and having a fastener element that is preferably pivotably attached to the plate so that it may be, more or less, in the plane of the cross plate in one desired position and may be moved to another position for engagement with a support.

In the drawings which illustrate a preferred embodiment of the invention,

FIG. 1 is a top plan view of one form of contemplated fastening device with a bolt member in concealed position;

FIG. 2 is an edge view of the device shown in FIG. 1 as viewed from the right;

FIG. 3 is an edge view of the device shown in FIG. 1 as viewed from the bottom of the figure with the bolt swung into engaging position;

FIG. 4 is an edge view of the device shown in FIG. 3 from the opposite side;

FIG. 5 is a section taken on the line 5—5 of FIG. 1;

FIG. 6 is a plan view partly in section of a hollow molding and two fastener members assembled therewith;

FIG. 7 is an enlarged section taken on the line 7—7 of FIG. 6 with the bolt in the up or concealed position; and FIG. 8 is a section similar to FIG. 7 with the bolt in the down or attaching position.

There has been a need in the automobile manufacturing industry for a molding fastener that can be attached to a hollow molding so as not to protrude from the underside thereof until the molding is ready for application to the body of the motor vehicle. A reason is to permit assembly of the fasteners to moldings and then ship them to an assembly plant. With the types of fasteners now in use this cannot be done without special and expensive packaging because the normally exposed attaching shanks of the fasteners protrude from beneath the molding and damage may result to the fasteners and/or to the finish of the moldings.

Fasteners of the type covered by this invention overcome these problems and will be particularly useful to motor vehicle manufacturers. The particular fastening device illustrated by the drawings includes a cross plate 1 shaped to be inserted into a hollow molding 2 from the under side in a conventional manner, as shown in FIG. 6. The cross plate 1 has the usual spring finger 3 carried thereby for holding the fastener in a given position in the molding 2. Any desirable form of shank fastener may be assembled with the cross plate 1 in pivoted engagement therewith. However, a simple T-shaped bolt or screw has been illustrated. This bolt or screw has a threaded shank 4 and an elongated head 5. Assembly of the bolt to the plate 1, in pivoted arrangement therewith, may be accomplished in a number of different ways but the disclosure in the drawings shows a simple and inexpensive construction.

The cross plate 1 is preferably inexpensively blanked from sheet metal and folded to form a hollow fold portion 6 preferably located at one side of the plate and adjacent to an aperture 7 in the plate (FIGS. 3 and 5). A slit 8 is shown (FIGS. 1 and 5) to illustrate where the edges of the blank abut when the folding is completed. A spring finger 9 is formed integral with the fold portion 6 and extends over the aperture 7 (FIG. 5) and bears upon the elongated head 5 of the shank fastener.

A shank fastener member may be easily assembled to the elongated plate 1 while both parts are in parallel related positions, as shown in FIG. 5, and the elongated head 5 snaps beneath the spring finger 9 to assure assembly.

Normal assembly of the fastener members with a molding 2 is shown in FIGS. 6 and 7 and when it is desired to assemble the molding to a support (not shown) the threaded shanks 4 are pulled downwardly until they extend in directions normal to the plane of the molding 2, as shown in FIG. 8. In these later mentioned positions of the threaded shanks the spring fingers 9 press upon the tops or rounded portions 10 of the elongated heads 5 and the shank portions are held steady relative to their plates 1 because the bottom surfaces 11 are flat and rest squarely against the flat surfaces of the plates 1.

It will be noted that the shanks 4 of the screws have square portions 12 (FIGS. 4 and 6) between the heads 5 and the threaded portion for cooperation with straight sides 13—13 of the walls of the aperture 7 so that they are prevented from turning in the plates when nuts are applied to the shanks.

While a specific construction of fastening device has been illustrated and described it should be understood that variations as to shape, manner of attachment to moldings, and even snap fastener shanks, instead of bolts, may be used without departing from the scope of the invention which is best defined by the following claims.

I claim:

1. A fastening device for assembly with a hollow molding and the like, said fastening device comprising a cross plate for insertion within said molding, a fastener shank assembled with said cross plate and pivot means provided between the cross plate and the fastener shank whereby said shank may be moved from a plane substantially parallel with said plate and within the molding to a position extending normal to the plane of said plate and exposed beyond the molding.

2. A fastening device for assembly with a hollow molding and the like, said fastening device comprising a cross plate for insertion within said molding, a fastener shank assembled with said cross plate and pivot means provided between the cross plate and the fastener shank whereby said shank is permitted to be moved from a plane substantially parallel with said plate and within the molding to a position extending normal to the plane of said plate and exposed beyond the molding, and fastener positioning means provided as a part of the fastening device operable to hold the fastener shank in either of the said two positions relative to said cross plate.

3. A fastening device for assembly with a hollow molding and the like, said fastening device comprising a cross plate for insertion within said molding, a fastener shank assembled with said cross plate and pivot means provided between the cross plate and the fastener shank whereby said shank is permitted to be moved from a plane substantially parallel with said plate and within the molding to a position extending normal to the plane of said plate and exposed beyond the molding, said pivot means comprising an elongated head bearing upon said cross plate and a spring finger carried by said cross plate and bearing upon said elongated head.

4. A fastening device for assembly with a hollow molding and the like, said fastening device comprising a cross plate for insertion within said molding, said cross plate having a fold portion providing a space above the plane of said cross plate, an aperture in said cross plate adjacent to said fold and a finger extending from said fold over said aperture and a pivoted fastener member assembled with said cross plate, said fastener member having an elongated head bearing upon said cross plate adjacent to said aperture and having a shank extending through the aperture in one pivoted position and into the space provided by the fold in another pivoted position and said finger engaging said elongated head and holding the fastener member in either of said pivoted positions.

5. A fastening device according to claim 4 wherein the finger is yieldable, integral with the fold portion, and extends over the aperture in the cross plate.

6. A fastening device according to claim 4 wherein the pivoted fastener member is a T-shaped bolt.

References Cited in the file of this patent

UNITED STATES PATENTS

| | | |
|---|---|---|
| 2,531,352 | Churchill | Nov. 21, 1950 |
| 2,798,404 | Schaefer | July 9, 1957 |
| 2,852,828 | Hamman | Sept. 23, 1958 |